United States Patent
Basteck

(10) Patent No.: US 7,559,813 B2
(45) Date of Patent: Jul. 14, 2009

(54) POD SHIP PROPULSION SYSTEM PROVIDED WITH A HYDRODYNAMIC GEAR

(75) Inventor: Andreas Basteck, Lörrach (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 1 day.

(21) Appl. No.: 11/575,836

(22) PCT Filed: Aug. 20, 2005

(86) PCT No.: PCT/EP2005/009023

§ 371 (c)(1),
(2), (4) Date: Jun. 12, 2007

(87) PCT Pub. No.: WO2006/037401

PCT Pub. Date: Apr. 13, 2006

(65) Prior Publication Data

US 2007/0270052 A1    Nov. 22, 2007

(30) Foreign Application Priority Data

Oct. 5, 2004    (DE) .................. 10 2004 048 754

(51) Int. Cl.
    *B60L 11/00*    (2006.01)
(52) U.S. Cl. .................. 440/6; 440/58; 475/215
(58) Field of Classification Search .................. 440/6,
    440/58, 59, 67, 113; 475/205, 211, 215
    See application file for complete search history.

(56) References Cited

U.S. PATENT DOCUMENTS

| 3,094,967 A | * | 6/1963 | Willis, Jr. .................. 440/58 |
| 3,104,641 A |   | 9/1963 | Forehlich |
| 3,180,180 A |   | 4/1965 | Helfer et al. |
| 3,601,980 A | * | 8/1971 | Faber .................. 440/75 |
| 3,683,719 A | * | 8/1972 | Gros .................. 74/661 |
| 4,430,908 A |   | 2/1984 | Stockton |
| 4,459,873 A |   | 7/1984 | Black |
| 5,108,324 A |   | 4/1992 | Adams et al. |
| 2002/0197918 A1 | | 12/2002 | Aarnivuo |

FOREIGN PATENT DOCUMENTS

| CA | 1 311 657 | 12/1992 |
| DE | 27 14 866 | 11/1977 |
| DE | 33 05 705 | 9/1983 |
| DE | 39 38 085 | 9/1991 |
| DE | 200 20 769 | 4/2001 |
| DE | 20020769 | 4/2001 |
| DE | 101 52 488 | 6/2002 |
| JP | 2000142576 | 5/2000 |
| SU | 1664656 | 7/1991 |

OTHER PUBLICATIONS

English language abstract only.
English language abstract only 07231991, 05232000, 06062002.

* cited by examiner

*Primary Examiner*—Lars A Olson
(74) *Attorney, Agent, or Firm*—Baker & Daniels LLP

(57) ABSTRACT

The invention relates to a pod ship propulsion System comprising a housing (3) connected to a ship hüll (2), an electric drive motor (8) mounted inside the housing at least one propeller (4) disposed outside the housing, wherein said electric drive motor is connected to the propeller by means a hydrodynamic gear (10).

9 Claims, 2 Drawing Sheets

POD SHIP PROPULSION SYSTEM PROVIDED WITH A HYDRODYNAMIC GEAR

CROSS-REFERENCE TO RELATED APPLICATION

This application is related to and claims the benefit under 35 U.S.C. §119 and 35 U.S.C. §365 of International Application No. PCT/EP2005/009023, filed Aug. 20, 2005.

The invention relates to a pod ship propulsion system with a gear, in particular a hydrodynamic gear.

In the case of pod ship propulsion systems, the ship propellers are driven with the help of an electrical drive machine, which is housed in a separate housing outside the ship hull. The unit, made up of the electrical drive machine, the ship propeller and the housing, is typically fully pivotable, i.e. rotations of 360° are possible. The term "pod" has come to be used to describe this type of configuration. The energy required for the electrical drive machine is usually provided by means of a diesel generator, which is then in turn housed at a suitable location in the hull of the ship. The connection to the ship body is usually established by an installation block, in which the pod is infinitely pivotable. Furthermore, a slip ring unit and hydraulic control units for turning the pod are located on the side of the ship hull. The spacing of the pod from the ship hull necessary for the propeller freewheel is achieved via a connection bridge, which is shaped like a rudder profile. The connection bridge thereby creates a connection between the installation block and the motor housing of the pod, which usually has a streamlined shape.

The fundamental idea of pod ship drives was already disclosed in 1951 by the U.S. Pat. No. 2,714,866, while the implementation first took place 40 years later. Since then, pod ship propulsion systems have prevailed as the preferred drive units for certain types of ships, e.g. ferries, icebreakers and cruise ships. Pod ship propulsion systems that have be implemented up to now have both pulling and pushing as well as a combination of pulling and pushing propelling screws. In particular for large ship units, two or more pod ship propulsion systems are preferred, wherein they can operate independently of each other due to the independent control of the propelling screws and with respect to the corresponding pod in comparison to the ship hull.

The special advantage of pod ship propulsion systems is the resulting improved maneuverability. Alternative systems, like rudder propellers, are usually intended for slow moving ships and their aerodynamic optimization does not meet the requirements of increased travel speeds that are possible with pod ship propulsion systems. Voith-Schneider drives, in which the size and direction of the propeller hub can be changed quickly and in a continuously variable manner, have also become known for particularly versatile ships. However, the disadvantage of such Voith-Schneider drives is their complicated production and the resulting costs, so that smaller ships in particular have proven to be suitable for this drive principle.

The forces created by a pod ship propulsion system are to be seen as a combination of propeller and rudder forces. According to this, a pod ship propulsion system combines active and passive control devices, wherein high control forces also result at high speeds of travel. Moreover, a pod ship propulsion system can be constructed specifically for good hydrodynamic effectiveness and thus serves above all as a propulsion organ with excellent control properties. From this follows that conventional control systems, such as stern thrusters, can be forgone. Further specific advantages of a pod ship propulsion system are the controllability even during emergency stop maneuvers, a decrease in the vibration tendency of the ship and the option of incorporating the ship drive into the ship construction at a much later time due to the module structure.

There are also other advantages based on the diesel-electric drive combination, which is available for the pod drive. While additional space is required in the case of a conventional ship drive due to the drive shaft, which connects the ship propeller and the diesel machine, space can be saved through the separate accommodation of a diesel generator into one drive system located outside the hull of the ship. Moreover, the diesel generator can be housed at a suitable location due to the omission of a drive shaft. This results in increased freedom of design in the construction of the stern and the adjacent loading area. This type of additional freight hold space is particularly advantageous for freight ships and roll-on/roll-off ferries.

When using pod ship propulsion drives, there is also generally no need for a tugboat in the case of river trips. It was, in particular, this advantage that led to the implementation of the pod ship propulsion system in cruise ships, which often dock at underdeveloped port facilities. Another advantage of diesel-electric ships, in particular for those vessels that have a high on-board energy demand, is that the full power of the main diesel machine is also available for the electrical supply in the case of slow speeds of travel. This is e.g. relevant for ferry ships.

However, a pod ship propulsion system also has disadvantages compared to conventional ship drives. This can be seen in particular in additional power loss and the resulting increased consumption of approx. 3-6% compared to conventional drives. Moreover, conventional drives still have advantages in particular in the case of especially fast moving ships. These advantages are at least partially based on the fact that the electrical drive machine is limited with respect to its dimensions. It was thus shown that a housing diameter of the pod is preferably somewhat less than 50% of the propeller diameter. The resulting need to use small electrical drive machines also means that the available engine torque and, accordingly, the torque of the ship propeller are limited. From this follows that a propeller with a higher engine speed is required instead of an optimally slow running ship propeller and thus multiple additional percentage losses for pod ship propulsion drives are added with respect to a drive with less torque and a larger propeller. These losses can only partially be compensated by the gains created through the lack of resistance from additional rudder systems as well as the possibility of optimally designing the stern using a pod ship propulsion system.

The object of the invention is to design a pod ship propulsion system such that the above disadvantages are resolved. In particular, a pod ship propulsion system, which is suitable for use with slow turning ship propellers and which simultaneously allows a hydrodynamically preferred outer design in the case of a smaller pod diameter, should be specified. Furthermore, the energy efficiency of the entire diesel-electric drive system should be improved for a pod ship propulsion system.

In order to solve the object according to the invention, the inventors first recognized that a fast running electrical drive machine combined with a hydrodynamic drive can propel a slow running and thus optimal propeller, wherein an overall size reduction simultaneously takes place based on the fast speed of the electrical drive, which in turn leads to an advantageous and improved pod design.

In the case of an electrical drive machine, the gap torque is mainly determined by the magnetic field and by the diameter of the rotor. For engines made of the same materials, no great improvement in the magnetic flow is possible so that only an increase in the gap torque and thus the drive torque can be achieved via the diameter and the length of the rotor. However, if fast running motors are used, then a considerable reduction in the diameter of the electrical drives is possible with the same power output.

In accordance with the invention, a hydrodynamic drive is used to connect the fast running electrical machine to the slow running ship propeller. This type of drive is characterized by the use of a hydrodynamic unit, for example a hydrodynamic converter, a hydrodynamic coupling or a Trilok torque converter, which regulates or controls at least a portion of the power flow directed from the electrical drive machine to the ship propeller.

The use of at least two power branches, which are merged back together by means of an override drive, for example a planetary drive or a linkage, has proven to be particularly advantageous in order to transfer at least indirectly power to the ship propeller. In a preferred embodiment, the electrical drive machine is connected at least indirectly with a first power branch, which in turn drives at least indirectly the sun wheel of a planetary drive. A second power branch, which comprises a hydrodynamic component, has an at least indirect coupling with the first power branch and also transfers power to the planetary drive, for example through an at least indirect connection to the internal gear. The power flows from the first and the second power branch thus merged via the planetary drive as an override drive serve to drive a ship propeller coupled at least indirectly with the planet wheel mount of planetary drive, which rotates with a much lower and variable speed compared to the electrical drive machine.

At the discretion of an expert, it is also possible to merge the power flows in a different manner using a planetary drive. It is thus conceivable that the first power branch accesses at least indirectly the internal gear and the second power branch, the sun wheel of the planetary drive. Combinations or the use of alternative override drives are also possible.

Due to the control and regulation of a hydrodynamic component, it is now possible to regulate and/or control the power flow from the first to the second power branch and thus to adjust the output engine speed of the override drive.

In an especially preferred embodiment of the invention, the electrical drive machine is operated at a constant speed, while different speeds result for the ship propeller in accordance with the requirements for the ship propulsion system. In contrast to the invention, the rotation speed of the ship propellers is adjusted via the frequency converter units of the electrical drive machine in accordance with the state of the art. The electrical drive machine with a fixed speed can now be advantageously operated through the displacement of the regulation or control for the rotation speed of the ship propeller into the hydrodynamic drive of the pod ship propulsion system according to the invention and can thus always be operated optimally with respect to efficiency and losses. Moreover, the motor's tendency to overheat is also reduced considerably.

It is hereby particularly preferred when the entire diesel-electric drive of the pod ship propulsion system according to the invention operates on a mean voltage level, since there is an advantageous embodiment with respect to the space required for the supply lines and losses.

The invention is described in greater detail below based on figures.

Figure 3:
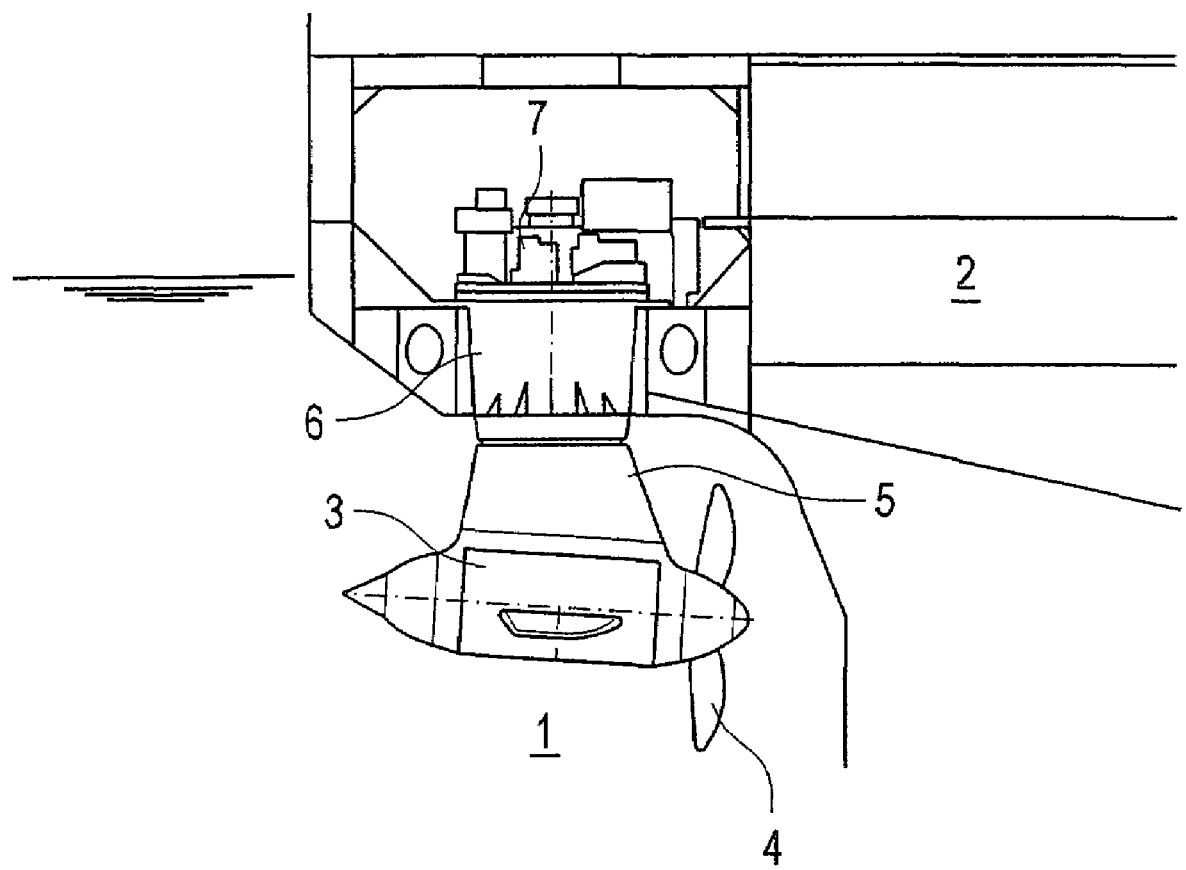
FIG. 3 shows a stern with a pod ship propulsion system with a double-propeller arrangement.

FIG. 3 shows the typical arrangement of the pod ship propulsion system 1 on the stern of a ship hull 2. The main components of the unit located outside the ship hull 2, which is usually called a pod, are a housing 3, at least one ship propeller 4, wherein a pulling ship propeller 4 is shown in this case.

In accordance with an advantageous embodiment, the diameter of the housing, i.e. the diameter of the housing expansion projected onto the surface of the ship propeller 4, is <50% of the ship propeller diameter.

The components of the pod ship propulsion system shown in FIG. 3 include a connection bridge, which ensures a separation distance between the pod and the ship hull and which is typically shaped like a rudder. The fastening of the connection bridge on the ship hull 2 is established through an installation block 6, which allows an endless rotation of the pod and also normally comprises further components like a hydraulic control unit for rotating the pod as well as air/water heat exchanger for motor cooling air.

A diesel generator 7 for supplying the pod's electrical drive machine with power is located at a suitable location on the ship hull, normally astern. Both synchronous and asynchronous machines can be used as the electrical drive of a pod, wherein motors with a double coil arrangement, which are fed from two transformers, are normally used for safety purposes. The engine speed and the torque of the motor are regulated via frequency converters by means of transformers in the case of ship propellers without drives driven electrically according to the state of the art. These are not shown in detail in FIG. 3.

Figure 1:
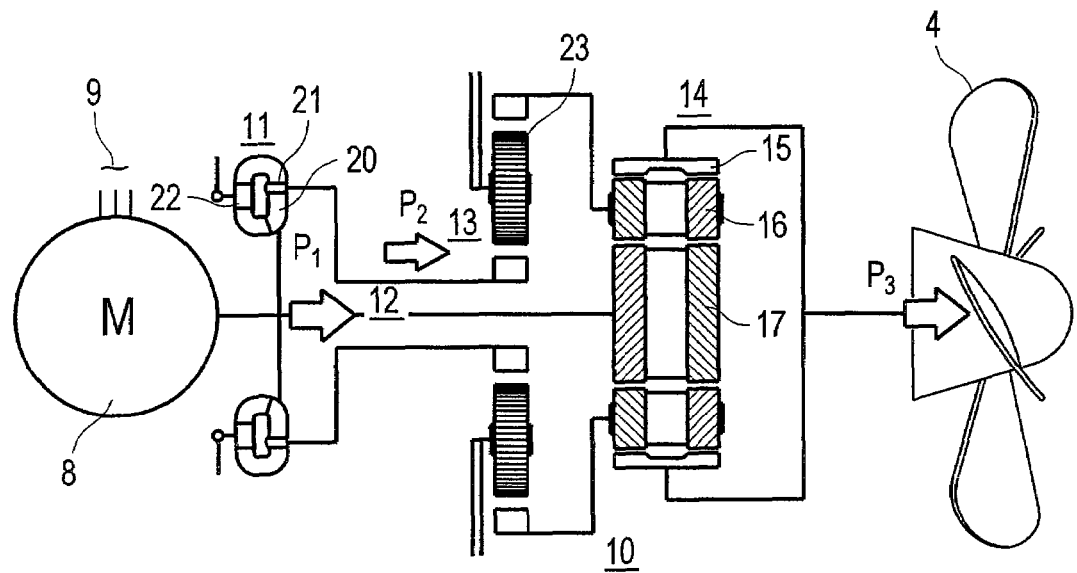
FIG. 1 shows a first embodiment of a drive train for a pod ship propulsion system according to the invention with a hydrodynamic drive.

FIG. 1 shows a schematically simplified representation of a drive train according to the invention for a pod ship propulsion system. The electrical drive machine 8 is powered by a generator that is connected to a diesel engine or a gas turbine and is designed in particular as a fast running electro-motor. Fast running is understood to be a speed that is higher than the desired rotation speed of the ship propeller 4; the rotation speed is typically higher than 200 rpm. The setting of a constant speed for the electrical machine is especially preferred. The constantly rotating electrical drive machine can be operated according to the number of poles and the power frequency, e.g. 50 Hz, with a constant speed of e.g. $N_1=600$, $N_2=750$, $N_3=1000$, $N_4=1500$.

In accordance with the invention, the drive train for the pod ship propulsion system comprises a hydrodynamic drive 10, a hydrodynamic component 11. The drive train comprises a first power branch 12 and a second power branch 13. Both the first power branch 12 and the second power branch 12 are connected at least indirectly with an override drive 14. In the exemplary embodiment in accordance with FIG. 1, a planetary drive is shown as the override drive 14, comprising an internal gear 15, a planet wheel mount 16 and a sun wheel 17.

In the exemplary embodiment, the first power branch 12 of the hydrodynamic drive is connected at least indirectly with the sun wheel 17 of the planetary drive. In a preferred embodiment, this is a fast running shaft, which is directly driven by the electrical drive machine 8. However, in an alternative embodiment, it is also possible to interconnect additional drive components in the first power branch 12.

The second power branch 13 comprises at least one hydrodynamic component 11, a hydrodynamic converter in the case shown here. It is connected at least indirectly to the first power branch 12 by means of its pump wheel 20 and transfers power from the first power branch 12 to the second power branch 13 via the turbine wheel 21 depending on the location of the guide wheel 22. The second power branch 13 is at least indirectly connected with the override drive 14. In the case shown here, the power is transferred to the planet wheel mount 16 via an additional stand drive 23 with a fixed gear transmission ration, which serves to adjust the engine speed.

Due to the control or regulation of the power flow from the first power branch 12 to the second power branch 13 via the hydrodynamic component 11, it is now possible to perform an adjustment of the output speed of the override drive 14. In the present case, power flows from the override drive 14, here the planetary drive, to the ship propellers 4 via the internal gear 15 of the planetary drive. Commensurate with the control or regulation of the hydrodynamic component 11, this speed can be adjusted according to the drive requirements of the vessel.

A direct coupling of the hydrodynamic component 11 with the normally quickly rotating axis of the first power branch 12 is especially preferred so that the hydrodynamic component 11 arranged in the second power branch 13 can be operated efficiently. The embodiment according to FIG. 1 shows the direct access of the pump wheel 20 to the output shaft of the electrical drive unit 8, which is characterized by fast rotation.

Figure 2:
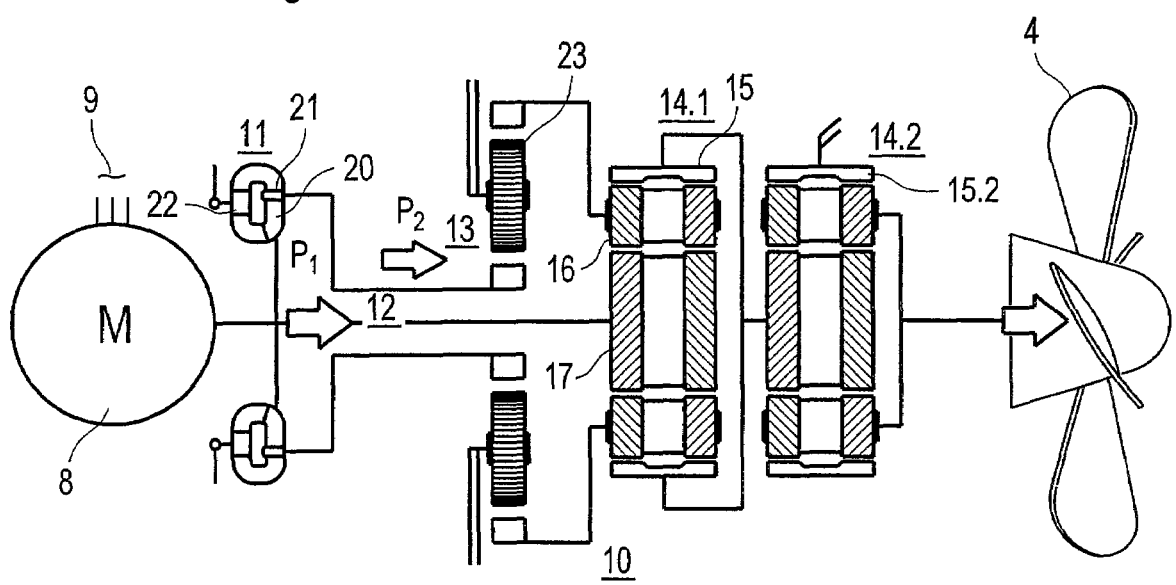
FIG. 2 shows a further embodiment of the hydrodynamic drive from FIG. 1 with an additional gear reduction stage in order to decrease the speed of the ship propeller.

FIG. 2 shows a further embodiment of the drive train according to the invention for pod ship propulsion drives, wherein a first override drive 14.1 serves to bring together the power flows of the first power branch 12 and the second power branch 13. The subsequent drive component 14.2 with a fixed transmission ratio, which is also shown here in the embodiment as a planetary drive with established internal gear 15.2, enables further reduction of the rotation speed of the ship propeller 4, whereby the use of a slow, large and thus efficient ship propeller 4 is enabled.

This drive train, shown in greater detail in FIG. 2, can also be designed as a two-stage linkage instead of the override drive 14.1 and the subsequent drive components 14.2. The power consolidation of power branches 12 and 13 then takes place in the complete, two-stage linkage.

The invention claimed is:

1. A pod ship propulsion system, comprising:
   a housing pivotally connected to a ship hull;
   an electrical drive machine within the housing;
   at least one ship propeller outside the housing; and
   a hydrodynamic drive operably connecting the electrical drive machine to the propeller;
   said hydrodynamic drive comprising a first power branch and at least one second power branch, wherein the first power branch is operably connected at least indirectly with the electrical drive machine and the second power branch includes a hydrodynamic component that is connected at least indirectly with the first power branch, and further including an overdrive that brings together power flows from the first and second branches to thereby transfer power at least indirectly to the propeller;
   the electrical drive having a substantially constant speed and said hydrodynamic drive including a control element in the hydrodynamic component of the second power branch to vary the speed of the propeller.

2. The pod ship propulsion system according to claim 1, wherein the overdrive is a planetary drive or a linkage.

3. The pod ship propulsion system according to claim 2, wherein the hydrodynamic component in the second power branch is a hydrodynamic converter or a hydrodynamic coupling or a Trilok torque converter.

4. The pod ship propulsion system according to claim 2, wherein the electrical drive machine is designed as a fast running drive machine and the ship propeller is driven at a low speed.

5. The pod ship propulsion system according to claim 1, wherein the hydrodynamic component in the second power branch is a hydrodynamic converter or a hydrodynamic coupling or a Trilok torque converter.

6. The pod ship propulsion system according to claim 5, wherein the electrical drive machine is designed as a fast running drive machine and the ship propeller is driven at a low speed.

7. The pod ship propulsion system according to claim 1, wherein the electrical drive machine is designed as a fast running drive machine and the ship propeller is driven at a low speed.

8. The pod ship propulsion system according to claim 1, wherein a projection of the housing on the ship propeller is smaller than the diameter of the ship propeller.

9. The pod ship propulsion system according to claim 1, wherein the electrical drive machine is designed as a fast running drive machine and the ship propeller is driven at a low speed.

* * * * *